United States Patent [19]

Smart et al.

[11] Patent Number: 4,947,197

[45] Date of Patent: Aug. 7, 1990

[54] SIMPLE CAMERA FOR USE WITH FILM CASSETTE HAVING FILM-EXPOSURE STATUS INDICATOR

[75] Inventors: David C. Smart, Rochester; Dennis E. Baxter, East Rochester, both of N.Y.

[73] Assignee: Eastman Kodak Company, Rochester, N.Y.

[21] Appl. No.: 407,170

[22] Filed: Sep. 14, 1989

[51] Int. Cl.$^5$ .............................................. G03B 1/00
[52] U.S. Cl. ................................. 354/214; 354/289.1
[58] Field of Search ............................ 354/212–216, 354/289.1, 275; 242/71, 71.1

[56] References Cited

U.S. PATENT DOCUMENTS

| | | | |
|---|---|---|---|
| 4,134,657 | 1/1969 | Nomura | 354/212 |
| 4,423,943 | 1/1984 | Gold | 354/275 X |
| 4,682,870 | 7/1987 | Atkinson | 354/275 |

*Primary Examiner*—Brian W. Brown

*Attorney, Agent, or Firm*—Roger A. Fields

[57] ABSTRACT

A simple inexpensive camera to be used with a film cassette having a film-exposure status indicator movable from an unexposed position for providing a visible indication that a filmstrip within the cassette is generally unexposed, to a partly exposed position for providing a visible indication that the filmstrip is only partly exposed, and to an exposed position for providing a visible indication that exposure of the filmstrip is completed, is adapted to move the status indicator from its unexposed position to its exposed position, without stopping at its partly exposed position, substantially when film drive means of the camera changes the state of the filmstrip relative to the cassette. The change of state of the filmstrip relative to the cassette may be accomplished in the camera either by advancing the filmstrip from the cassette to expose the filmstrip or by returning the filmstrip to the cassette to safeguard the filmstrip.

8 Claims, 17 Drawing Sheets

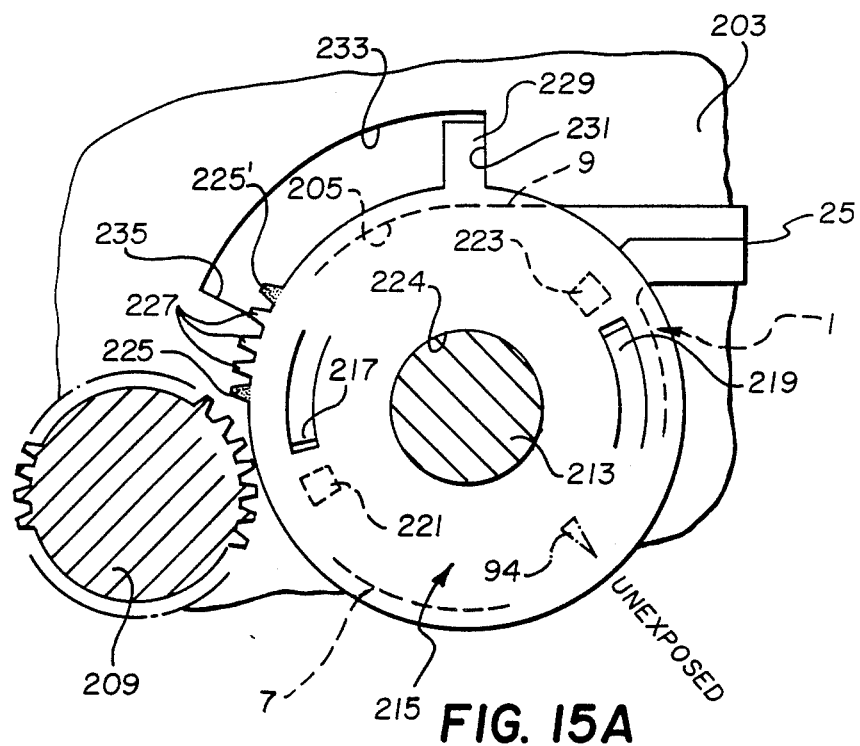
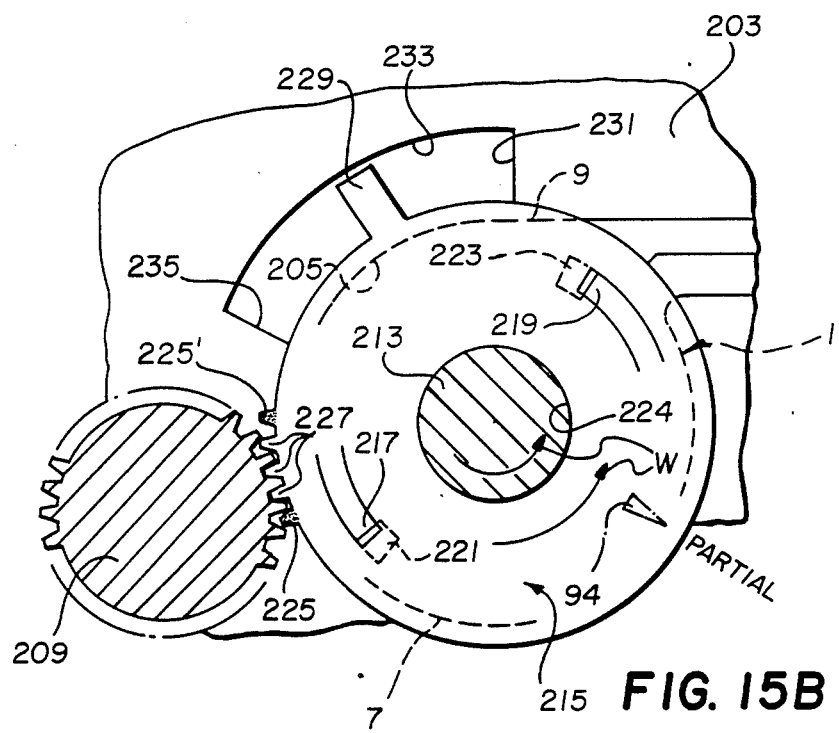

SIMPLE CAMERA FOR USE WITH FILM CASSETTE HAVING FILM-EXPOSURE STATUS INDICATOR

CROSS-REFERENCE TO RELATED APPLICATION(S)

Reference is made to commonly assigned copending application Ser. No. 07/390,931 entitled CAMERA FOR USE WITH FILM CASSETTE HAVING FILM-EXPOSURE STATUS INDICATOR, and filed August 8, 1989 in the names of David C. Smart and Dennis E. Baxter.

BACKGROUND OF THE INVENTION

1. Field of the Invention

The invention relates generally to the field of photography, and particularly to cameras. More specifically, the invention relates to a simple inexpensive camera intended for use with a film cassette having a film-exposure status indicator.

2. Description of the Prior Art

In conventional 35 mm film manufacturers'cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is manually rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this nonslipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance the filmstrip out of the cassette shell by rotating the film spool in the unwinding direction. Moreover, the film leader is non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is slightly tapered to allow it to freely extend from between the circumferential lips and rest against the shell wall. During unwinding rotation of the film spool, the leading end of the filmstrip is advanced to and through a film passageway opening in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced to the outside of the cassette shell. In the patent, it is suggested that one manually rotate the film spool relative to the cassette shell until the film leader can be manually grasped and attached to a film advancing device in the camera Thus, the camera is not used to rotate the film spool to advance the filmstrip from the cassette shell.

In conventional 35 mm film manufacturers' cassettes, after the filmstrip is completely exposed, the film spool is rotated in a winding direction to rewind the film leader into the cassette shell. Since the film leader cannot subsequently be advanced out of the cassette shell (because of the binding effect between the film roll and the shell), this usually serves as an indication that the filmstrip is completely exposed. Conversely, in the film cassette disclosed in U.S. Pat. No. 4,423,943, the film leader can be automatically advanced out of the cassette shell by rotating the film spool in the unwinding direction. This can be done regardless of whether the filmstrip is unexposed, completely exposed, or partly exposed. Thus, the film cassette provides no indication as to the exposure status of the filmstrip.

THE CROSS-REFERENCED APPLICATION

Cross-referenced application Serial No. 07/390,931 discloses a camera wherein a motorized film transport is operated in a prewind mode to continuously advance successive unexposed frames of a filmstrip (including a non-protruding film leader) from a light-tight cassette to a film take-up, without exposing any of the film frames at the focal plane of an objective lens, and is operated in a rewind mode to position respective unexposed frames for exposure at the focal plane and to return them individually to the cassette following each exposure. Before an exposed frame is returned to the cassette, a double exposure prevention (DEP) encodement is applied to the filmstrip at a predetermined location proximate the exposed frame. If the filmstrip is rewound into the cassette prematurely, i.e. without it being completely exposed, and at a later time the cassette is re-loaded into the camera, the film transport will be operated in the pre-wind mode to again advance the filmstrip (including the non-protruding film leader) from the cassette, but only until a DEP encodement is sensed. Then, the film transport will be operated in the rewind mode to return the exposed frame corresponding to the sensed encodement to the cassette and to position the next-available unexposed frame for exposure at the focal plane.

In the cross-referenced application, the cassette has a film-exposure status indicator movable from an unexposed position for providing a visible indication that the filmstrip is generally unexposed, to a partly exposed position for providing a visible indication that the filmstrip is only partly exposed, and to an exposed position for providing a visible indication that exposure of the filmstrip is completed. Since the camera is capable of returning the filmstrip to the cassette Prematurely when the filmstrip is only partly exposed and of advancing the filmstrip from the cassette subsequently to complete its exposure, it includes control means that operates drive means to move the status indicator from the unexposed position to the partly exposed position in the event the filmstrip returned to the cassette is partly exposed and to move the status indicator from either the unexposed or partly exposed position to the exposed position in the event the filmstrip returned to the cassette is substantially exposed.

SUMMARY OF THE INVENTION

It is desired to provide a camera that is simple and inexpensive as compared to the one disclosed in the cross-referenced application and yet can be used with a film cassette having a film-exposure status indicator movable from an unexposed position for providing a visible indication that a filmstrip within the cassette is generally unexposed, to a partly exposed position for providing a visible indication that the filmstrip is only partly exposed, and to an exposed position for providing a visible indication that exposure of the filmstrip is completed. Since the camera can be operated to return the filmstrip entirely to the cassette when the filmstrip is only partly exposed, but does not include any means for applying or reading a double exposure prevention (DEP) encodement proximate each exposed frame, it is adapted to move the status indicator from the unexposed position to the exposed position, without stopping at the partly exposed position, substantially when it changes the state of the filmstrip relative to the cassette, e.g. by advancing the filmstrip from the cassette to expose the filmstrip or by returning the filmstrip to the cassette to safeguard the filmstrip. This is done in order to alert the user not to re-load a cassette containing a non-encoded filmstrip that is only partly exposed into the camera or into the one disclosed in the cross-referenced application.

BRIEF DESCRIPTION OF THE DRAWINGS

FIGS. 15A, 15B, and 15C are schematic views depicting orientation of the drive means when the status indicator is in its respective positions;

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
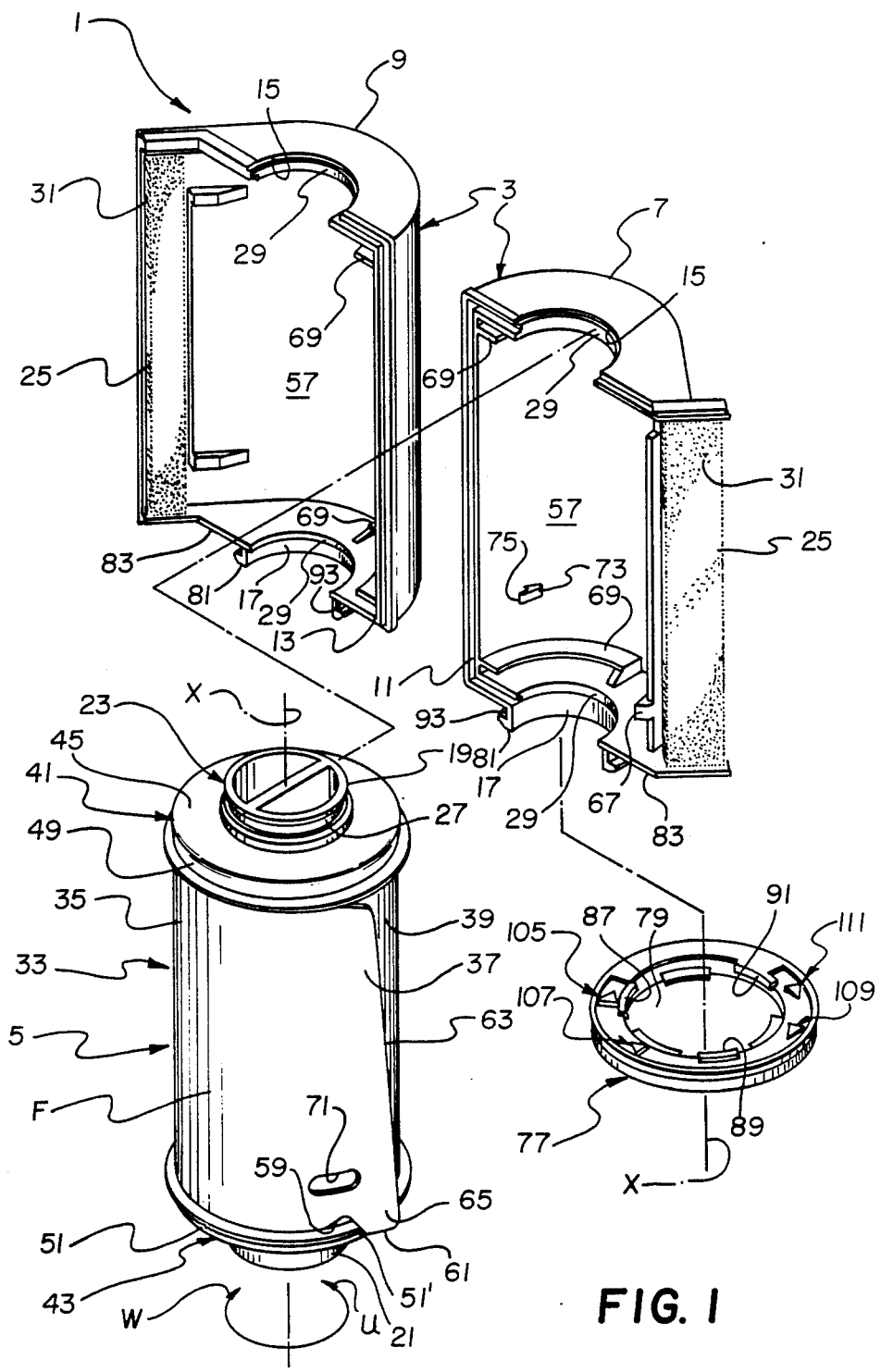
FIG. 1 is an exploded perspective view of a film cassette having a film-exposure status indicator as disclosed in cross-referenced application Ser. No.
Figure 2:
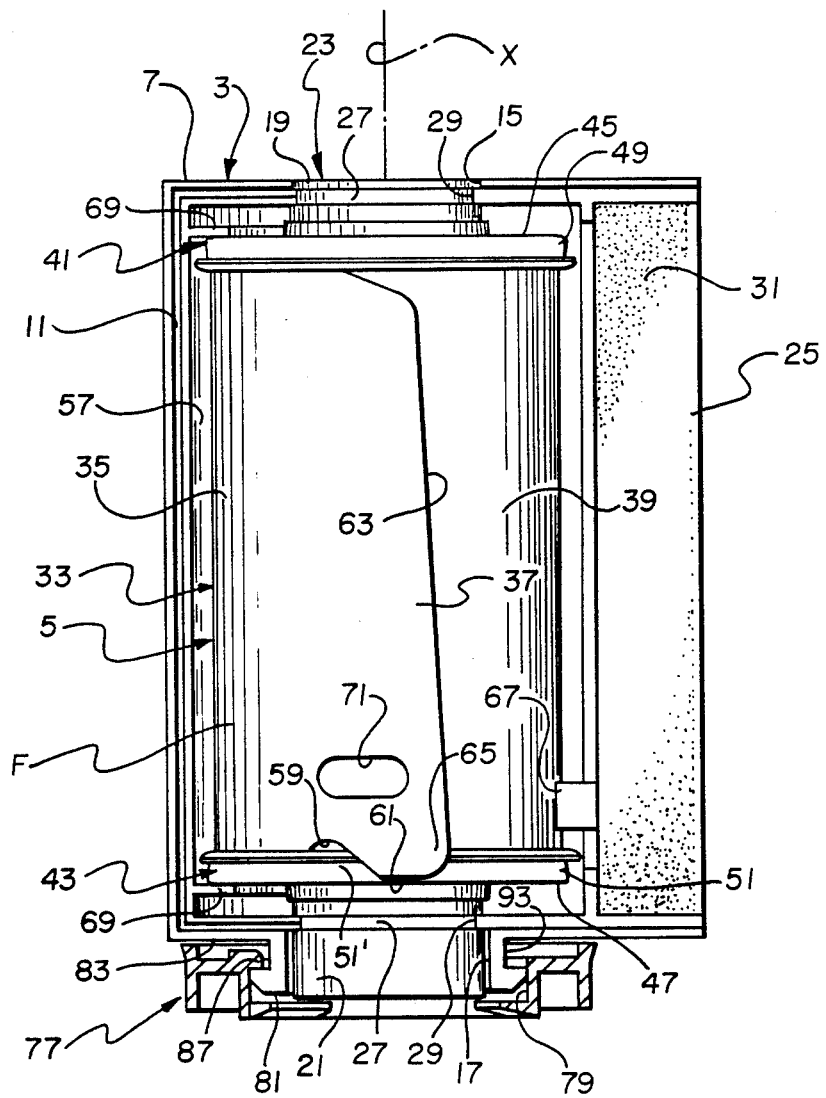
FIG. 2 is an elevation view of the film cassette, illustrating the cassette shell open to reveal a film roll coiled about a film spool.

Referring now to the drawings, FIGS. 1 and 2 depict a 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite end extensions 19 and 21 of a spool core or hub 23, and they define a film passageway 25 to the exterior of the cassette shell 3. The longer and shorter end extensions 19 and 21 of the spool core 23 each include an annular groove 27 which mates with a corresponding edge 29 of the respective openings 15 and 17 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
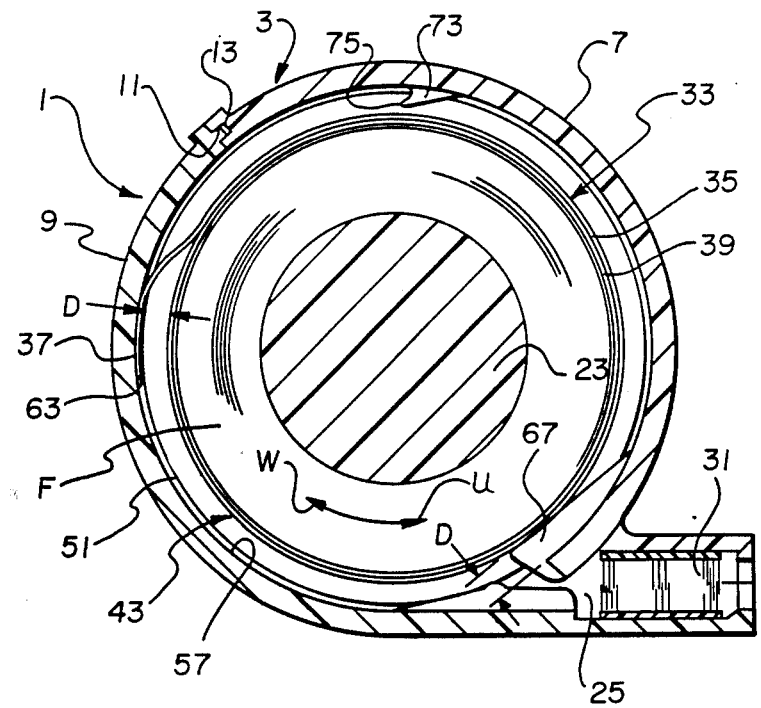
FIGS. 3 and 4 are end views in cross-section of the, cassette shell, the film roll, and the film spool.

A roll 33 of 35 mm filmstrip F is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. The inner or trailing end of an innermost convolution, not shown, of the film roll 33 is secured to the spool core 23.

Figure 6:
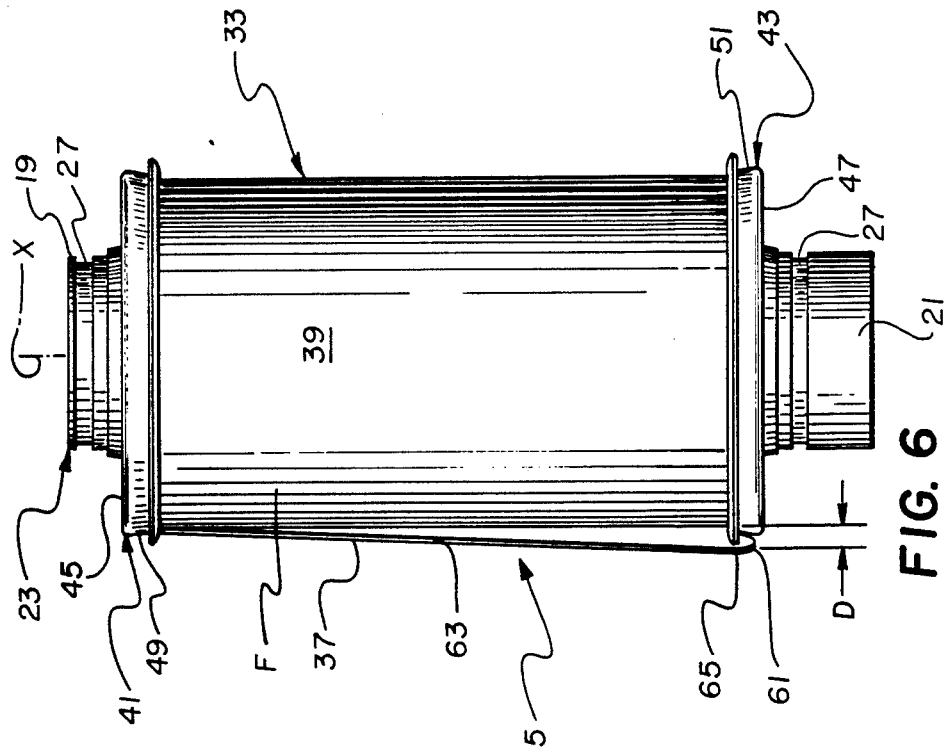
FIGS. 5 and 6 are elevation views of the film roll and the film spool, illustrating the manner in which the film roll is stored on the film spool.
Figure 5:
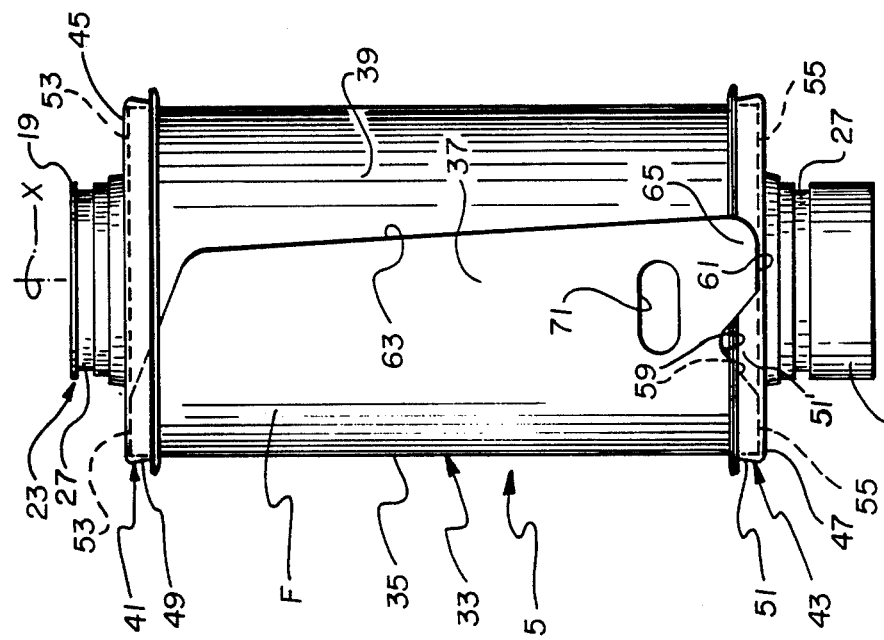
Figure 7:
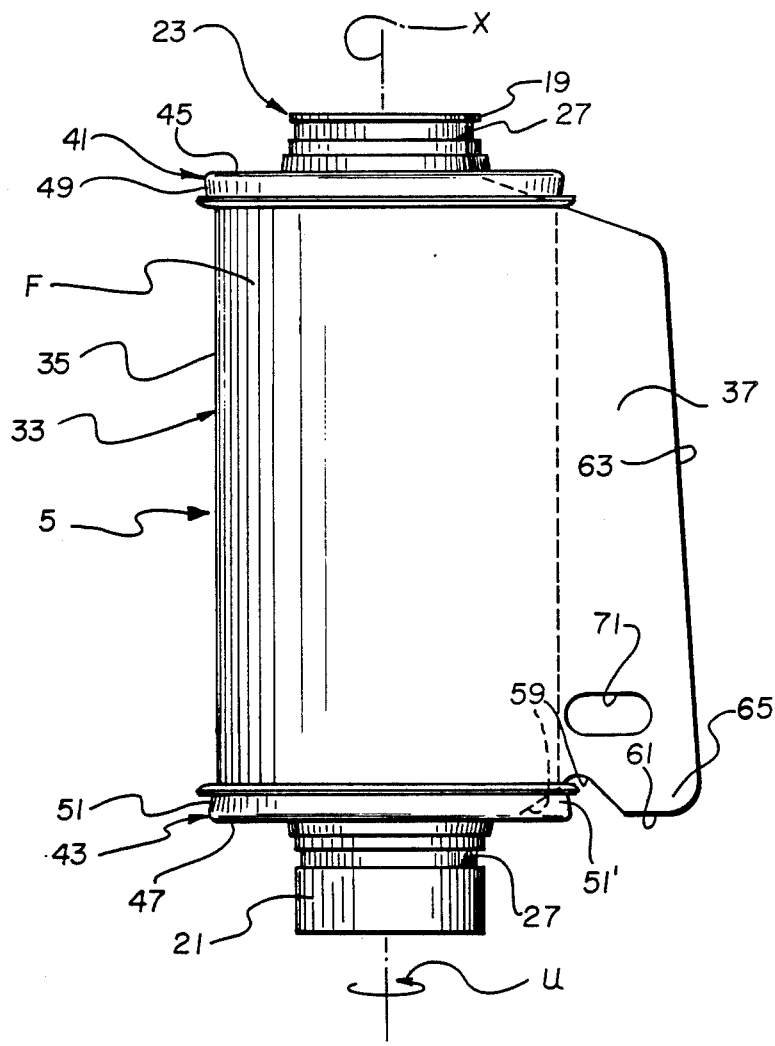
FIGS. 7 and 8 are elevation views similar to FIGS. 5 and 6, illustrating the manner in which the film roll is unwound from the film spool.

A pair of upper and lower identical, very thin, flexible film constraining flanges 41 and 43 are coaxially spaced along the spool core 23 as shown in FIGS. 1, 2, and 5. The two flanges 41 and 43 comprise respective integral disks 45 and 47 and respective integral annular lips or skirts 49 and 51 which circumferentially extend from the disks. The two disks 45 and 47 cover opposite flat sides, not shown, of the film roll 33 which are defined by corresponding opposite longitudinal edges 53 and 55 of each successive convolution of the film roll, and they have respective central holes, not shown, through which the spool core 23 axially extends to permit rotation of the spool core relative to the flanges 41 and 43. See FIG. 5. The annular lips 49 and 51 overlap the outermost convolution (film leader) 35 of the film roll 33 radially outwardly of the respective longitudinal edges 53 and 55 of that convolution to radially confine the convolution to thus prevent it from radially expanding or clock-springing into substantial contact with an interior curved wall 57 of the cassette shell 3. A lip-receiving notch 59 is cut in the outermost convolution (film leader) 35 along its longitudinal edge 55, relatively close to its leading end 37, to receive a peripheral section 51' of the annular lip 51. This allows a relatively short edge-section 61 of the outermost convolution (film leader) 35 connecting the leading end 37 and the notch 59 to overlap the annular lip 51 radially outwardly to thus maintain the leading end spaced a radial distance D from the next-inward convolution 39 of the film roll 33. See FIGS. 3 and 6. The leading end 37 has a forward edge 63 inclined from the longitudinal edge 53 of the outermost convolution 35 to the other longitudinal edge 55 of that convolution to form a forwardmost tip or tab 65 of the convolution which, like the edge-section 61, overlaps the annular lip 51 radially outwardly. See FIG. 5.

A film stripper-guide 67 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the unwinding direction U. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 3, the leading end 37 will be located within range of the stripper-guide 67 due to such spacing from the next-inward convolution 39.

Figure 8:
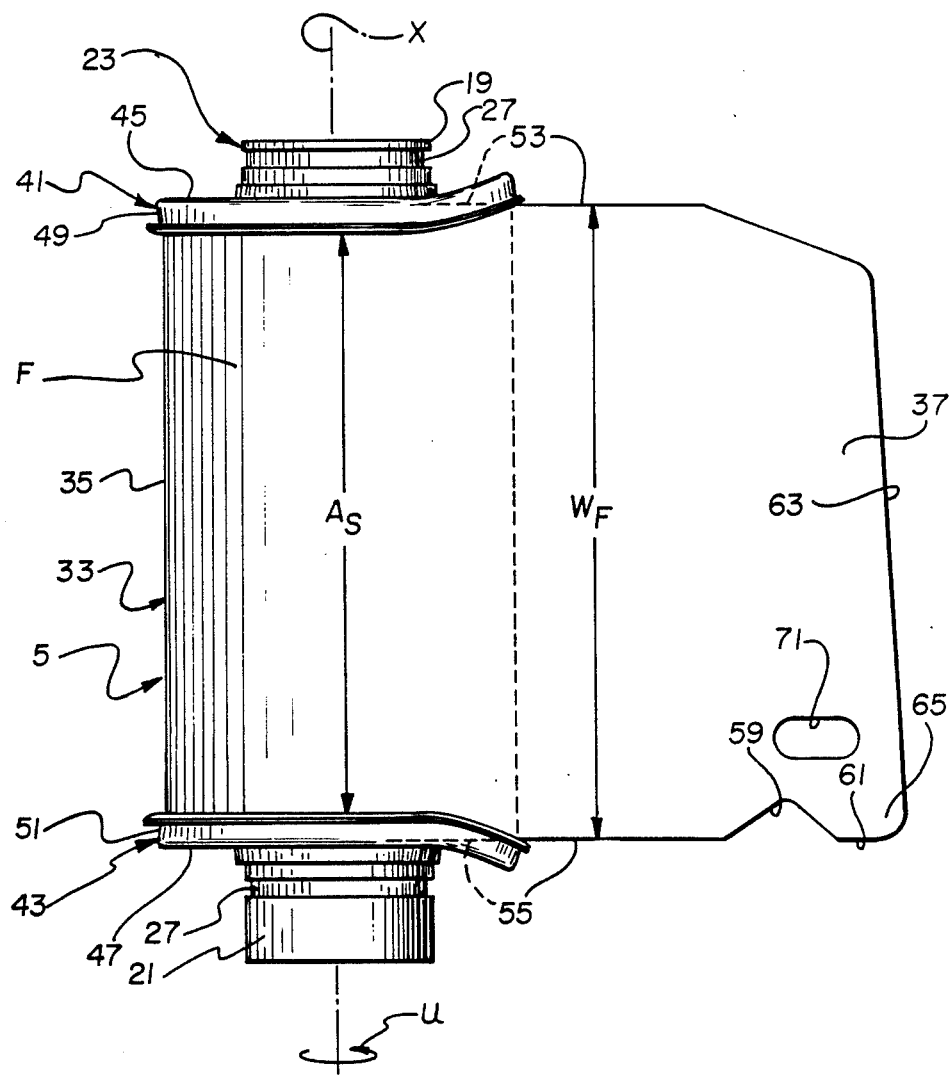

When the leading end 37 of the outermost convolution (film leader) 35 is advanced over the stripper-guide 67 responsive to rotation of the film spool 5 in the unwinding direction U, the longitudinal edges 53 and 55 of that convolution start to gently flex respective arcuate portions of the two flanges 41 and 43 axially away from one another as shown in FIG. 8; first to allow the notch 59 to separate from the lip section 51', and then to allow successive longitudinal sections of the film roll 33 (beginning with the leading end) to exit from between the flanges to the outside of the cassette shell 3. The local flexing of the flanges 41 and 43 occurs because the film width WF between the longitudinal edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 57 of the cassette shell 3 to lie flatly against successive arcuate portions of the two disks 45 and 47 as the flanges 41 and 43 are locally flexed axially away from one another, to thereby return the flexed portions of the flanges to their normal original non-flexed condition.

Figure 4:
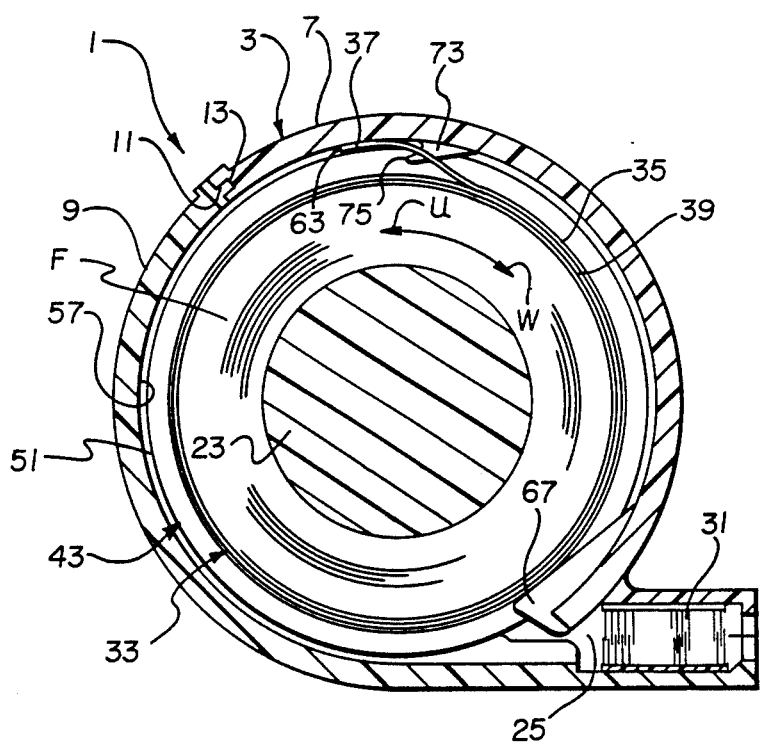

A slot 71 is cut in the outermost convolution (film leader) 35 substantially proximate its leading end 37. A tooth 73 fixed to the interior wall 57 of the cassette shell 3 has a free pointed end 75 which is positioned to be received in the slot 71 to thus engage the outermost convolution (film leader) 35, when the film spool 5 is rotated in the winding direction W as shown in FIG. 4, and to exit the slot to thus disengage that convolution, when the film spool is rotated in the unwinding direction U as shown in FIG. 3. The engagement of the outermost convolution 35 and the tooth 73 responsive to rotation of the film spool in the winding direction W prevents the leading end 37 of that convolution from coming to rest between the stripper-guide 67 and the next-inward convolution 39.

When the spool core 23 is initially rotated in the unwinding direction U, the two flanges 41 and 43 momentarily may remain stationary and the film roll 33, since its inner end is attached to the spool core, tends to expand radially or clock-spring to ensure a firm non-slipping relation between the outermost convolution (film leader) 35 of the film roll and the annular lips 49 and 51 of the flanges. Then, further rotation of the spool core 23 will similarly rotate the flanges 41 and 43. As a result, the leading end 37 of the outermost convolution (film leader) 35 will be advanced over the stripper-guide 67, causing successive arcuate portions of the flanges 41 and 43 to be flexed axially away from one another as shown in FIG. 8. This first allows the notch 59 to separate from the lip section 51', and then it allows successive longitudinal sections of the film roll 33 (beginning with the leading end 37) to exit from between the flanges to the outside of the cassette shell 3.

If the film spool 5 is rotated in the winding direction W before the entire length of the filmstrip F has been exposed, for example in a photographic camera, and it is desired to subsequently use the remaining available portion of the filmstrip at a later time, the film spool is rotated substantially until the slot 71 receives the free end 75 of the tooth 73 to thus engage the outermost convolution 35 (film leader) to the tooth. Thereafter, to use the remaining available portion of the filmstrip F, for example in a photographic camera, the film spool 5 is rotated in the unwinding direction U to disengage the outermost convolution (film leader) 35 from the tooth 73 and to re-advance the filmstrip to the outside of the cassette shell 3.

The Film-Exposure Status Indicator Of The Film Cassette

Figure 9:
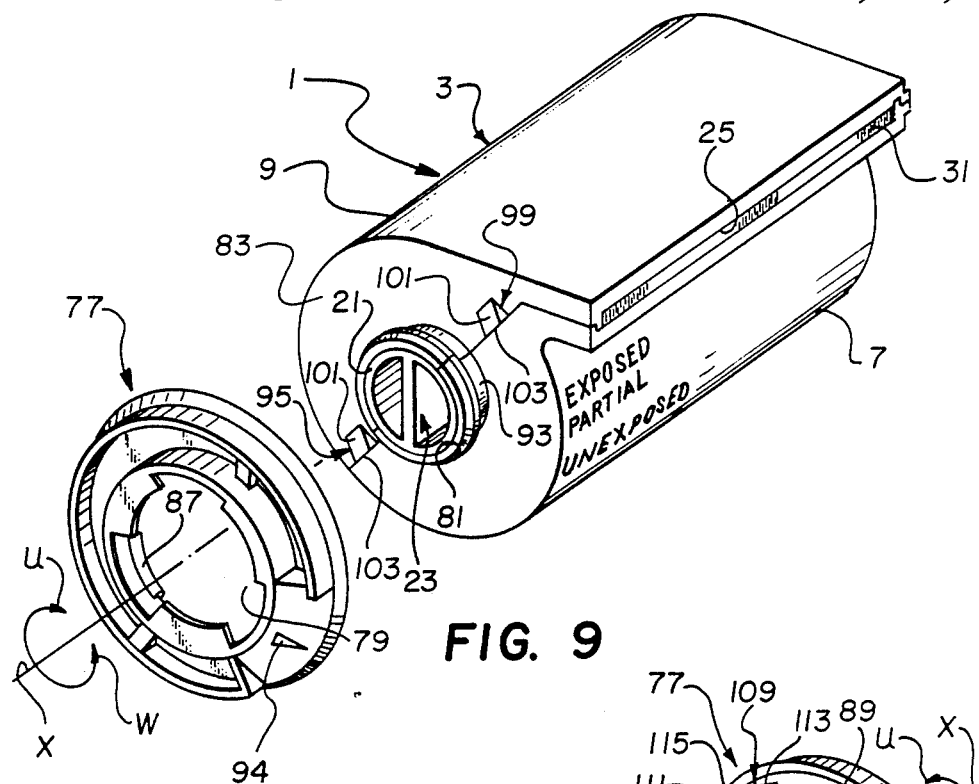
FIGS. 9 and 10 are exploded perspective views of the cassette shell and the film-exposure status indicator.
Figure 10:
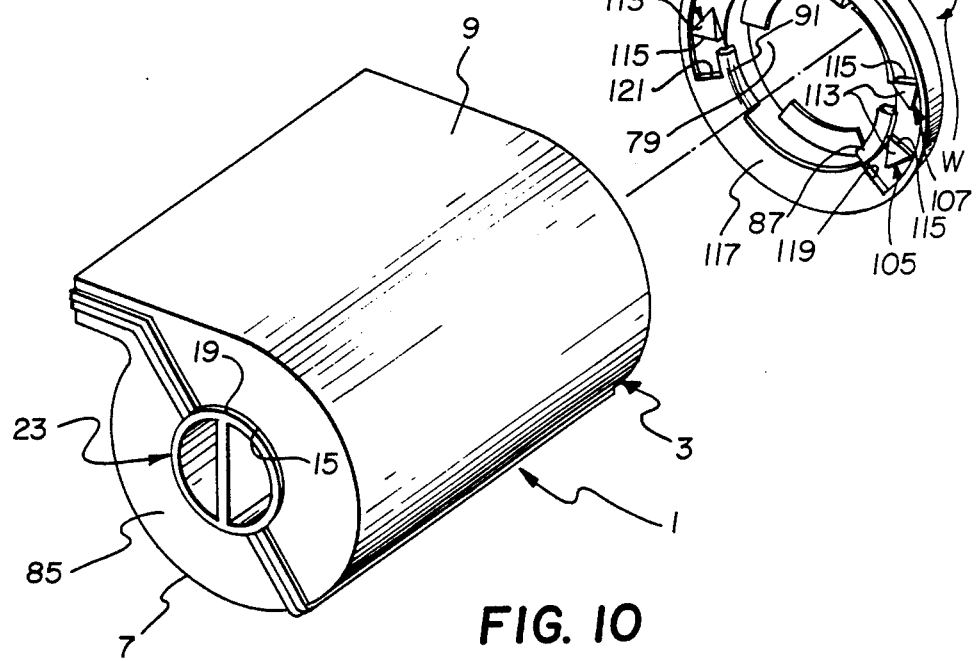

FIGS. 9 and 10 depict a ring-shaped film-exposure status indicator 77 having a central aperture 79 into which projects a neck-like extension 81 of one of two opposite exterior ends 83 and 85 of the cassette shell 3. The indicator 77 has three evenly spaced, radially inward tabs 87, 89, and 91 that fit into a peripheral annular groove 93 in the neck-like extension 81 to support the indicator for rotation about the axis X relative to the cassette shell 3 and the film spool 5.

Figure 11A:
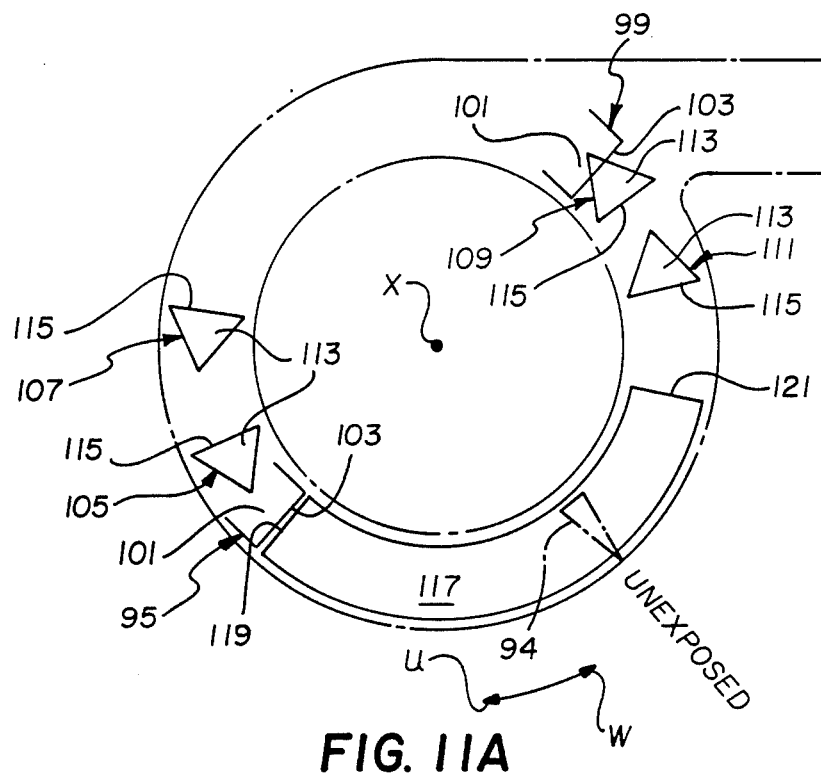
FIGS. 11A and 11B are schematic views depicting the status indicator in a normal first or unexposed position to indicate the film roll is generally unexposed.
Figure 12A:
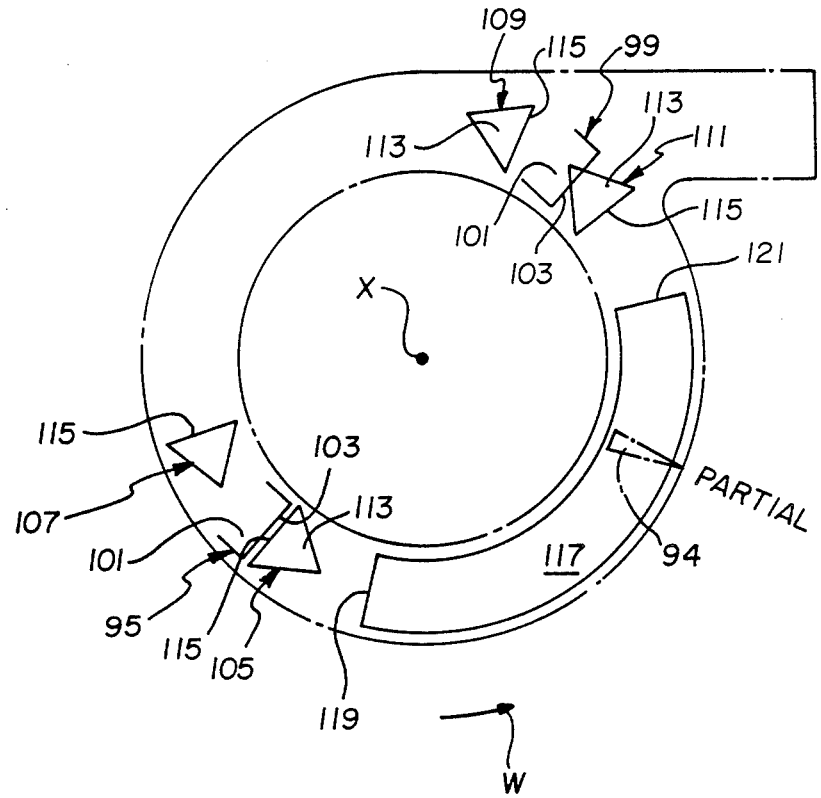
FIGS. 12A and 12B are schematic views depicting the status indicator in a second or partly exposed position to indicate the film roll is only partly exposed.
Figure 13A:
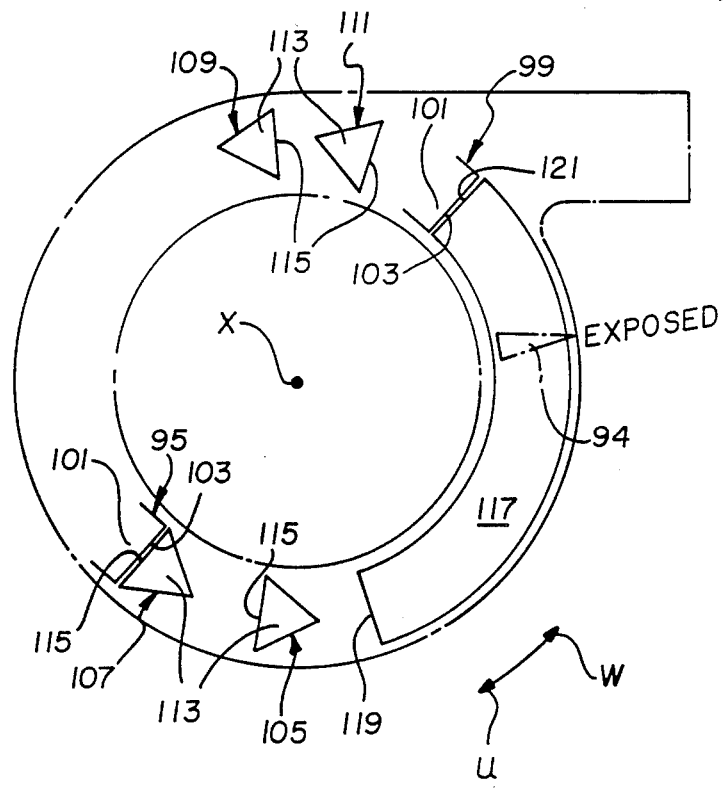
FIGS. 13A and 13B are schematic views depicting the status indicator in a third or exposed position to indicate the film roll is substantially exposed.
Figure 14:
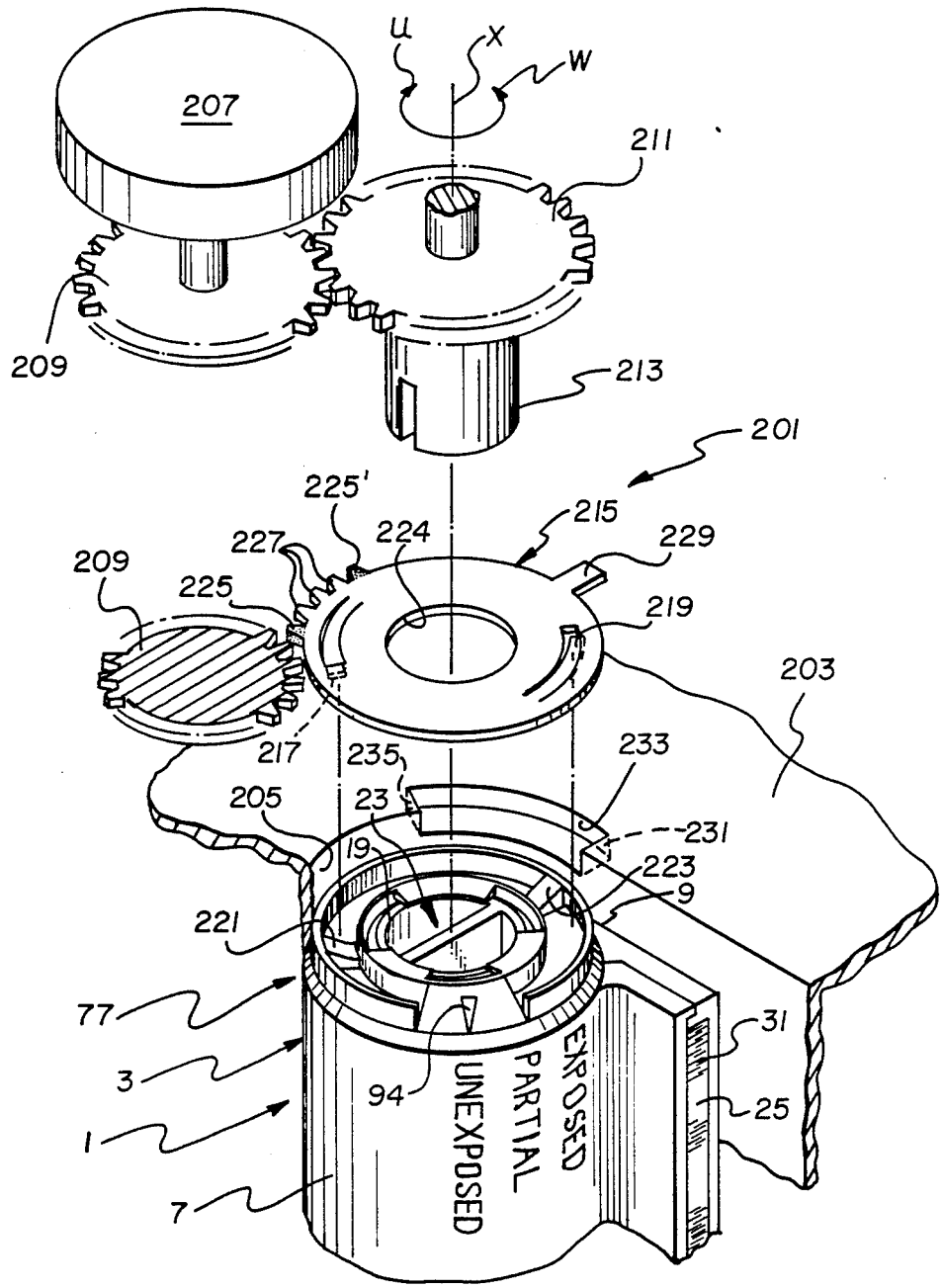
FIG. 14 is an exploded perspective view of camera apparatus including drive means for moving the status indicator of the film cassette from its unexposed position immediately to its exposed position responsive to a change of state of the filmstrip relative to the cassette, according to a preferred embodiment of the invention.

The indicator 77 is intended to be rotated, for example in the winding direction W, from an original or normal first position, shown in FIGS. 11A and 14, to successive second and third positions, shown in FIGS. 12A and 13A, for providing respective visible indications that the filmstrip F stored in the cassette shell 3 is generally unexposed, the filmstrip has been returned to the inside of the shell before all of the film frames have been exposed, and the filmstrip is substantially exposed. To achieve these visible indications, a pointer 94 is formed on the indicator 77 for individual alignment with each of three successive imprints "UNEX- POSED", "PARTIAL", and "EXPOSED" printed on the outside of the cassette shell 3. See FIG. 9. When the indicator 77 is in its first or unexposed position, shown in FIGS. 11A and 14, the pointer 94 points to the imprint "UNEXPOSED". When the indicator 77 is in its second or partly exposed position, shown in FIG. 12A, the pointer 94 points to the imprint "PARTIAL". When the indicator 77 is in its third or exposed position, shown in FIG. 13A, the pointer 94 points to the imprint "EXPOSED".

Figure 11B:
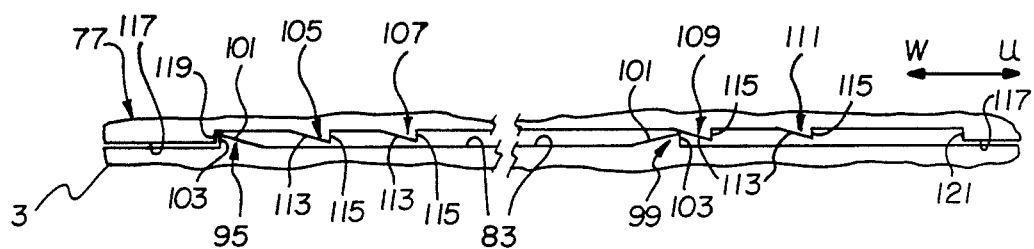
Figure 12B:
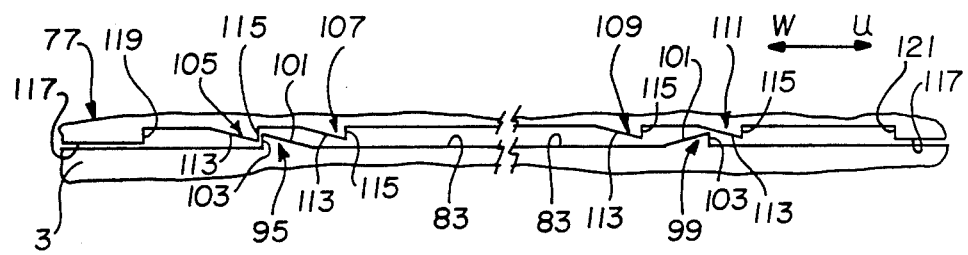
Figure 13B:
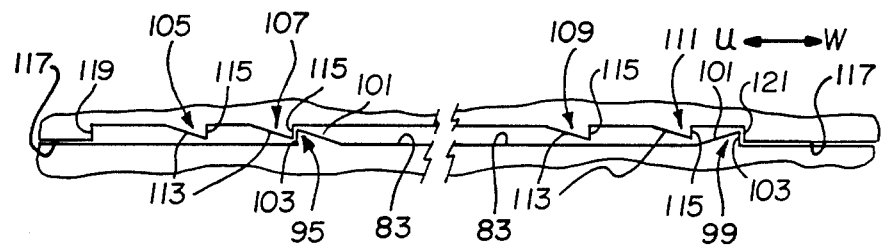

Cooperative engagement means are formed on the exterior end 83 of the cassette shell 3 and the underside of the indicator 77 for limiting rotation of the indicator unidirectionally in the winding direction W from its first or unexposed position to its second or partly exposed position and from the second position to its third or exposed position, and for preventing rotation of the indicator out of the third position. Specifically, the engagement means formed on the exterior end 83 of the cassette shell 3 comprises a pair of identical ramps 95 and 99, each having an inclined surface 101 and a cliff surface 103, and being radially in-line and equally spaced from the axis X. See FIGS. 9, 11A, and 11B. The engagement means formed on the underside of the indicator 77 comprises four identical ramps 105, 107, 109, and 111, each having an inclined surface 113 and a cliff surface 115, and each being equally spaced from the axis X, and a single flat 117 having two identical cliff surfaces 119 and 121 similarly spaced from the axis X. See FIGS. 10, 11A and 11B. When the indicator is in its first or unexposed position, shown in FIGS. 11A and 11B, the cliff surface 103 of the ramp 95 is located adjacent the cliff surface 119 of the flat 117, to absolutely prevent rotation of the indicator in the unwinding direction U, and the cliff surface 103 of the ramp 99 is located opposite the inclined surface 113 of the ramp 109, to lightly restrain the indicator from being rotated in the winding direction W. Thus, the indicator 77 is secured in the first or unexposed position, but can be moved to the second or partly exposed position. If the indicator 77 is then rotated in the winding direction W, the inclined surface 113 of the ramp 109 will move over the cliff surface 103 of the ramp 99. When the indicator 77 is in its second or partly exposed position, shown in FIGS. 12A and 12B, the cliff surface 103 of the ramp 95 is located adjacent the cliff surface 115 of the ramp 105, to absolutely prevent rotation of the indicator in the unwinding direction U, and the cliff surface 103 of the ramp 99 is located opposite the inclined surface 113 of the ramp 111, to lightly restrain the indicator from being rotated in the winding direction W. Thus, the indicator 77 is secured in the second or partly exposed position, but can be moved to the third or exposed position. If the indicator 77 is then rotated in the winding direction W, the inclined surface 113 of the ramp 111 will move over the cliff surface 103 of the ramp 99. When the indicator 77 is in its third or exposed position, shown in FIGS. 13A and 13B, the cliff surface 103 of the ramp 95 is located adjacent the cliff surface 115 of the ramp 107, to absolutely prevent rotation of the indicator in the unwinding direction U, and the cliff surface 103 of the ramp 99 is located adjacent the cliff surface 121 of the flat 117, to absolutely prevent rotation of the indicator in the winding direction. Thus, the indicator 77 cannot be moved out of the third or exposed position.

Camera Apparatus — Preferred

Referring now to FIG. 14, camera apparatus 201 is depicted for use with the film cassette 1 having the film-exposure status indicator 77. Briefly, the camera apparatus 201 is intended for use in a simple inexpensive camera as compared to the one disclosed in the cross-referenced application; that is, it cannot magnetically apply successive double exposure prevention (DEP) encodements to the filmstrip F to indicate respective film frames are exposed as in the cross-referenced application. Moreover, it cannot read the last DEP encodement applied to the filmstrip, to prevent re-exposure of the exposed frames when a partly exposed film roll is loaded in the simple inexpensive camera. Thus, the camera apparatus 201 is adapted to move the status indicator 77 from its normal first (unexposed) position to its third (exposed) position, without stopping at its second (partly exposed) position. This is done in order to alert the user not to re-load a cassette containing a non-encoded filmstrip that is only partly exposed into the simple inexpensive camera or into the one disclosed in the cross-referenced application.

As shown in FIG. 14, the camera apparatus 201 includes a camera body 203 having a loading chamber 205 for receiving the film cassette 1 laterally or axially (endwise). Conventional motorized film transport means comprises a reversible drive motor 207 coupled to a coaxial pinion gear 209. The pinion gear 209 is disposed in continuous mesh with an idler gear 211 coupled to a coaxial core hub 213 for engaging the spool core 23 of the film cassette 1 to rotate the spool core in the unwinding direction U or in the winding direction W in accordance with the rotational direction of the reversible drive motor 207. Although not shown, the motor 207 is coupled via appropriate transmission gears to another hub that engages a film take-up spool or drum rotatably supported within a take-up chamber in the camera body 203, to rotate the take-up drum in the winding direction W or in the unwinding direction U according to custom.

When fresh, unused, unexposed film is loaded in the camera apparatus 201, the film transport means including the motor 207 is operated in a prewind mode initially to rotate the spool core 23 of the film cassette 1 in the unwinding direction U to propel the non-protruding leading end 37 of the filmstrip F out of the cassette shell 3, across a back frame opening situated at the focal plane of a taking (objective) lens, not shown, and onto the take-up drum. At the same time, the drum is rotated in the unwinding direction U to permit a tooth, located on its periphery, to engage the slot 71 cut in the filmstrip F proximate its leading end 37, to enable the drum to take-up the filmstrip. Following this, substantially the entire remainder of the filmstrip F is pre-wound without interruption from the cassette shell 3 across the back frame opening and onto the drum. The film movement occurs without exposing the filmstrip F. Since the trailing end, not shown, of the filmstrip F is secured to the spool core 23, an end-of-film condition will be reached which causes the motor 207 to stall, whereupon as is known a bi-directional circuit, not shown, reverses the motor to operate the film transport means in a rewind mode, opposite to the prewind mode. During the rewind mode, the spool core 23 is rotated in the winding direction W and the drum is rotated similarly. However, the film transport means including the motor 207 is de-energized once a first-available film frame is moved to an exposure position at the back frame opening. Then, after the first picture is taken, the film transport means is operated in the rewind mode to wind the first-exposed frame onto the spool core 23 and to move the next-available unexposed frame to the exposure position. This process is repeated following each film exposure, and the filmstrip F will thereby be rewound one exposed frame at a time into the cassette shell 3. Thus, the exposed frames will be protected inside the cassette shell 3 if, for example, a rear door, not shown, covering the loading chamber 205, is accidentally opened before the filmstrip F is completely returned to the film cassette 1.

Other elements of the camera apparatus 201 are shown in FIG. 14 for moving the status indicator 77 of the film cassette 1 from its normal first (unexposed) position to its third (exposed) position, without stopping at its second (partial) position. These elements include a drive ring 215 having two integral spring fingers 217 and 219 punched out at the underside of the drive ring for engaging respective fixtures 221 and 223 of the status indicator 77 to rotate the indicator in the winding direction W from its first (unexposed) position immediately to its third (exposed) position. The drive ring 215 has a central aperture 224 through which the core hub 213 extends in coaxial friction-driving/slipping relation with the ring, and it includes a sector gear portion comprising two compliant (resilient) peripheral outer teeth 225 and 225' and three rigid peripheral intermediate teeth 227 for successively engaging the pinion 209. Thus, the drive ring 215 can be friction-rotated by the core hub 213 to bring the sector gear portion into engagement with the pinion 209 to enable the pinion to hard-rotate the ring (in place of friction-rotation).

Figure 15C:
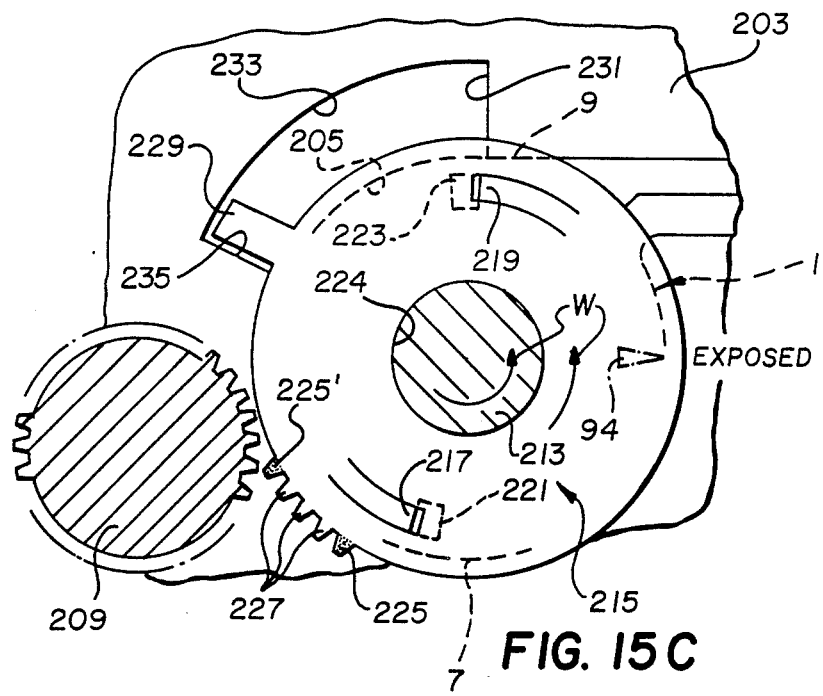

When the status indicator 77 is in its normal first (unexposed) position as shown in FIGs. 14 and 15A, the drive ring 215 is oriented with its respective spring fingers 217 and 219 slightly spaced from the two fixtures 221 and 223 of the indicator and with an integral rigid finger 229 abutting a stop wall 231 of a recess 233 in the loading chamber 205. Abutment of the rigid finger 229 with the stop wall 231 prevents rotation of the drive ring 215 in the unwinding direction U. If the core hub 213 is initially rotated in the winding direction W (during the rewind mode of the film transport means to move the first-available film frame to the exposure position), the frictional relation existing between the core hub and the drive ring 215 will friction-rotate the ring in the same direction until its compliant outer tooth 225 is moved into engagement with the pinion 209. Then, the pinion 209 will hard-rotate the drive ring 215 in the winding direction W to move its respective spring fingers 217 and 219 against the two fixtures 221 and 223 to, in turn, rotate the indicator 77 from its normal first (unexposed) position immediately to its third (exposed) position. See FIGS. 15B and 15C. As the indicator 77 reaches its third (exposed) position, the outer compliant tooth 225' of the drive ring 215 is moved clear of the pinion 209 via friction-rotation of the ring provided the core hub 213. However, since the indicator 77 cannot be rotated in the winding direction W beyond its third (exposed) position, continued rotation of the core hub 213 in the winding direction does not similarly rotate the drive ring 215, i.e. there is slippage between the two. Thus, as shown in FIG. 15C, the drive ring 215 is arrested with its rigid finger 229 slightly spaced from a stop wall 235 of the recess 233 in the loading chamber 205. Abutment of the rigid finger 229 with the stop wall 235, to prevent rotation of the drive ring 215 in the winding direction W, only occurs when the camera apparatus 201 is operated without the film cassette 1 present in the loading chamber 205.

Figure 16A:
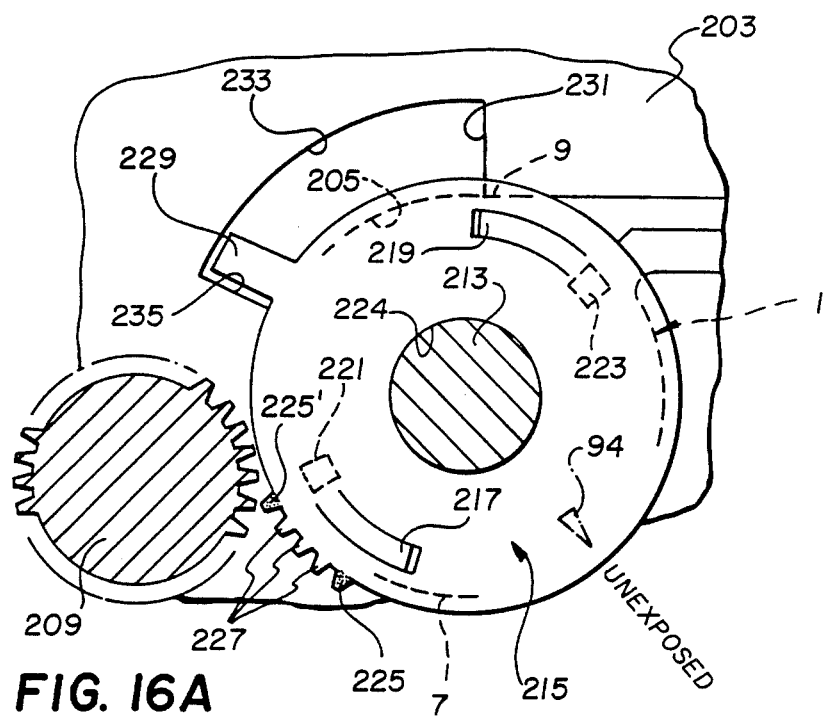
FIG. 16A is a schematic view depicting orientation of the drive means as in FIG. 15C but with a fresh cassette as in FIG. 15A.
Figure 16B:
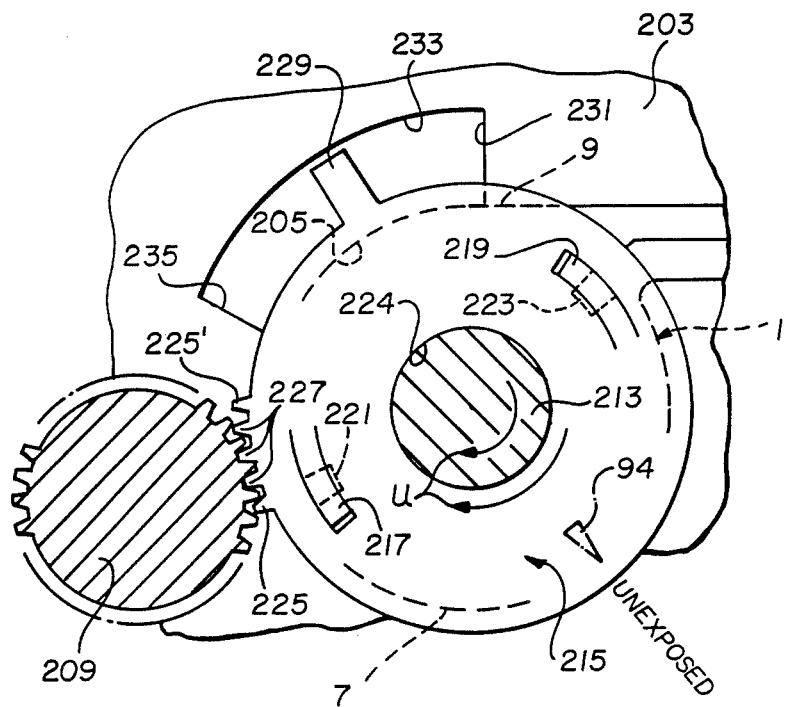
FIG. 16B is a schematic view continuing from FIG. 16A to show the manner of returning the drive means to its orientation in FIG. 15A.

FIG. 16A shows the drive ring 215 in the same orientation as in FIG. 15C, but with a new cassette 1 present in the loading chamber 205. In this instance, the status indicator 77 of the cassette is in its normal first (unexposed) position. If the core hub 213 is initially rotated in the unwinding direction U (during the prewind mode of the film transport means to propel the filmstrip F out of the cassette shell 3 and onto the take-up drum), the frictional relation existing between the core hub and the drive ring 215 will friction-rotate the ring in the same direction to move its compliant outer tooth 225' into engagement with the pinion 209. Then, as shown in FIG. 16B, the pinion 209 will hard-rotate the drive ring 215 in the unwinding direction U, causing the respective spring fingers 217 and 219 of the ring to move over the respective fixtures 221 and 223 of the status indicator 77. The pinion 209 hard-rotates the drive ring 215 in the unwinding direction U until its compliant outer tooth 225 is moved clear of the pinion via friction-rotation of the ring provided by the core hub 213. Then the core hub 213 frictionrotates the drive ring 215 in the unwinding direction U to move its rigid finger 229 against the stop wall 231 of the recess 233. See FIG. 15A.

Camera Apparatus — Alternate

Figure 17:
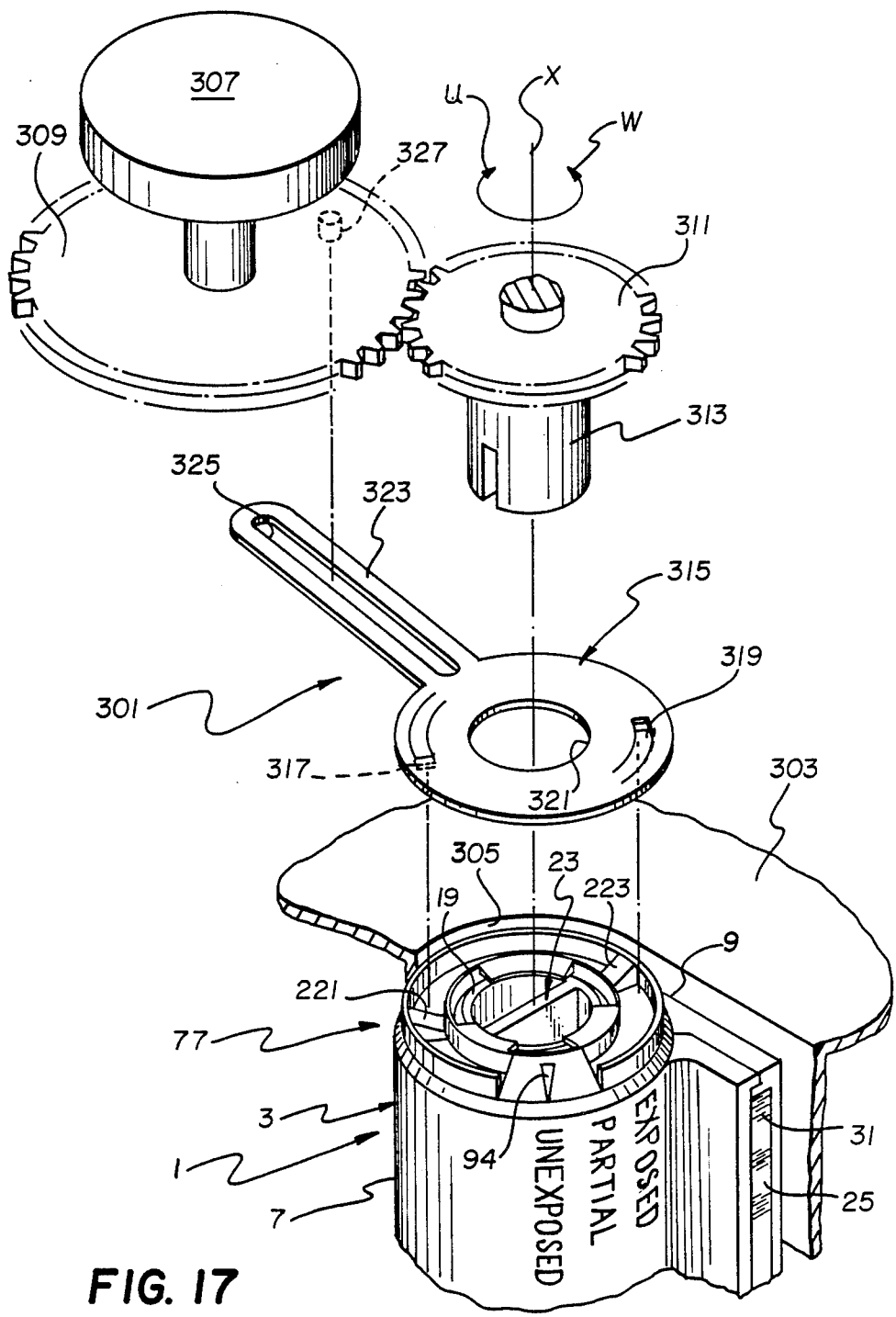
FIG. 17 is an exploded perspective view similar to FIG. 14 but of an alternate embodiment of the invention.

Referring now to FIG. 17, alternate apparatus 301 is depicted for use with the film cassette 1 to move the status indicator 77 of the cassette from its normal first (unexposed) position to its third (exposed) position, without stopping at its second (partial) position. The alternate apparatus 301 includes a camera body 303 having a loading chamber 305 for receiving the film cassette 1 laterally or axially (endwise). Conventional motorized film transport means comprises a reversible drive motor 307 coupled to a coaxial drive gear 309. The drive gear 309 is disposed in continuous mesh with an idler gear 311 coupled to a coaxial core hub 313 for engaging the spool core 23 of the film cassette 1 to rotate the spool core in the unwinding direction U or in the winding direction W in accordance with the rotational direction of the reversible drive motor 307. Although not shown, the motor 307 is coupled via appropriate transmission gears to another hub that engages a film take-up spool or drum rotatably supported within a take-up chamber in the camera body 303, to rotate the take-up drum in the winding direction W or in the unwinding direction U according to custom.

When fresh, unused, unexposed film is loaded in the camera apparatus 301, the film transport means including the motor 307 is operated in an initialization mode to rotate the spool core 23 of the film cassette 1 in the unwinding direction U to propel the non-protruding leading end 37 of the filmstrip F out of the cassette shell 3, across a back frame opening situated at the focal plane of a taking (objective) lens, not shown, and onto the take-up drum. At the same time, the drum is rotated in the unwinding direction U to permit a tooth, located on its periphery, to engage the slot 71 cut in the filmstrip F proximate its leading end 37, to enable the drum to take-up the filmstrip. Following this, the film transport means including the motor 307 is de-energized once a first-available film frame is moved to an exposure position at the back frame opening. Then, after the first Picture is taken, the film transport means including the motor 307 is operated in the same mode to wind the first-exposed frame onto the drum and to move the next-available unexposed frame to the exposure position. This process is repeated following each film exposure, and the filmstrip F will thereby be rewound one exposed frame at a time onto the drum. When exposure of the filmstrip F is completed, the film transport means including the motor 307 is operated in a rewind mode to rotate the spool core 23 of the film cassette 1 and the take-up drum in the winding direction W, to return the filmstrip to the cassette 1.

Other elements of the camera apparatus 301 are shown in FIG. 17 for moving the status indicator 77 of the film cassette 1 from its normal first (unexposed) position to its third (exposed) position, without stopping at its second (partial) position. These elements include a drive ring 315 having respective integral spring fingers 317 and 319 punched out at the underside of the drive ring for engaging the two fixtures 221 and 223 of the status indicator 77 to rotate the indicator in the winding direction W from its normal first (unexposed) position immediately to its third (exposed) position. The drive ring 315 has a central aperture 321 through which the core hub 313 extends in coaxial loose slipping relation, and it includes a radial arm 323 having a radial slot 325 in which is located a drive pin 327 fixed to the underside of the pinion 309.

Figure 18A:
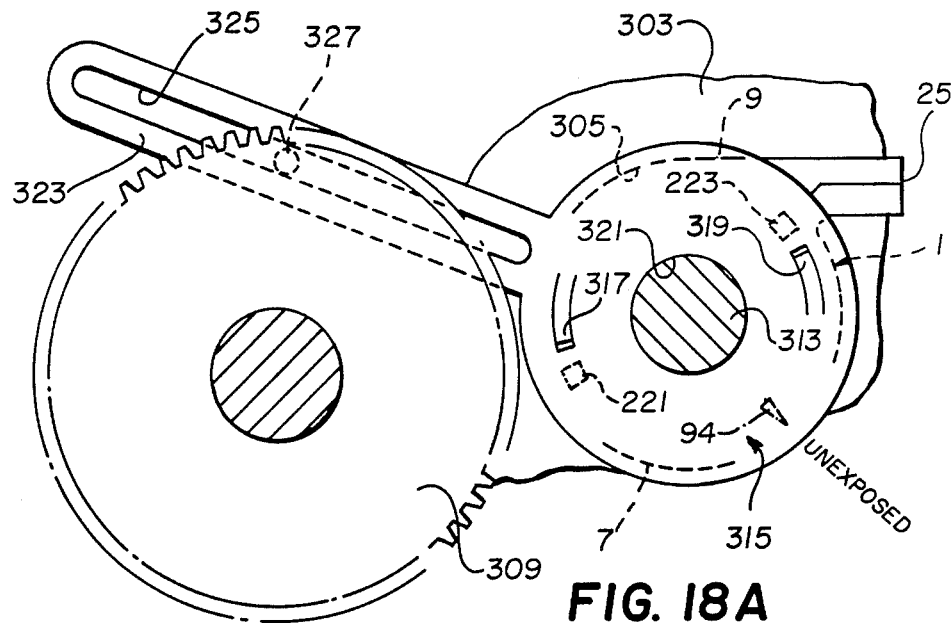
FIGS. 18A, 18B, and 18C are schematic views, corresponding to FIGS. 15A, 15B, and 15C, of drive means in the alternate embodiment for moving the status indicator of the film cassette.
Figure 18B:
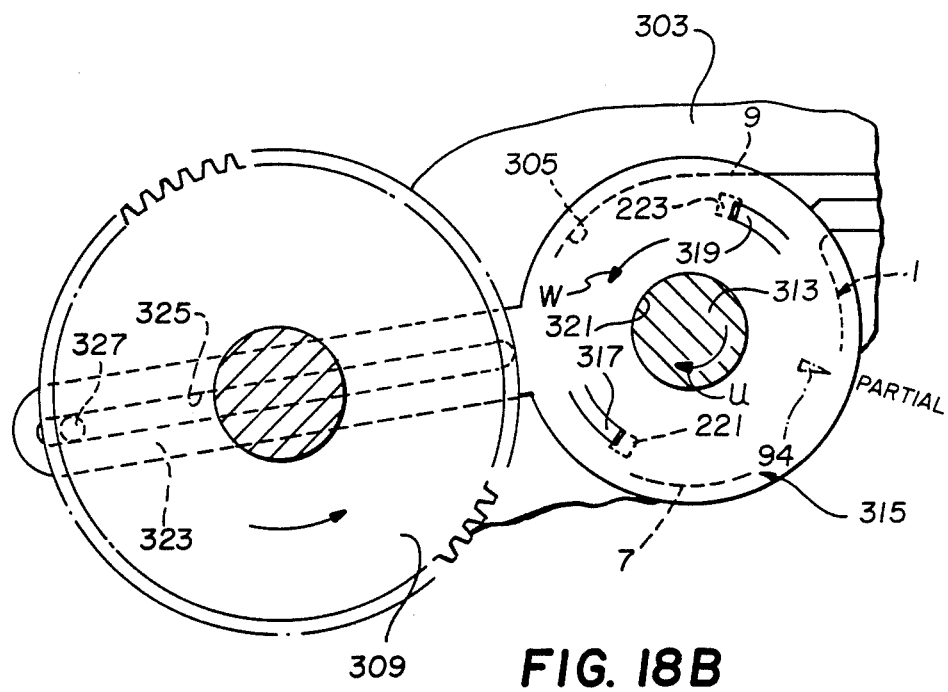
Figure 18C:
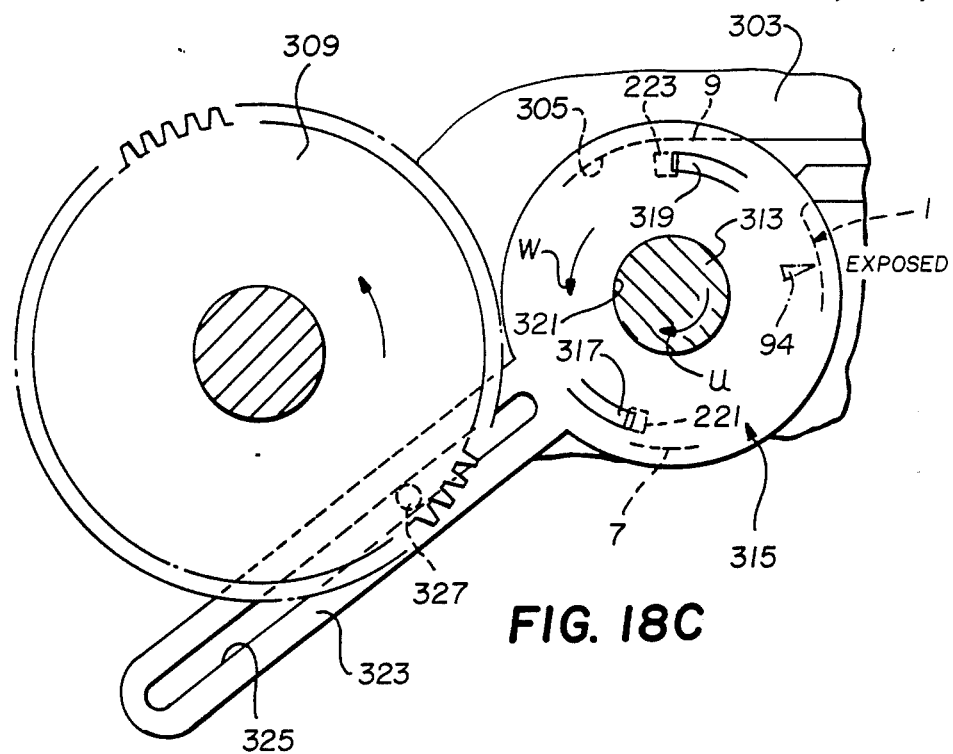

When the status indicator 77 is in its normal first (unexposed) position as shown in FIGS. 17 and 18A, the drive ring 315 is oriented with its respective spring fingers 317 and 319 slightly spaced from the two fixtures 221 and 223 of the indicator. If the film transport means is operated in the initialization mode as shown in FIGS. 18B and 18C, the core hub 313 is rotated in the unwinding direction U, but the drive ring 315 is rotated in the winding direction W. Thus, the respective spring fingers 317 and 319 of the drive ring 315 are moved against the two fixtures 221 and 223 to rotate the status indicator 77 in the winding direction W from its normal first (unexposed) position immediately to its third (exposed) position.

Figure 18D:
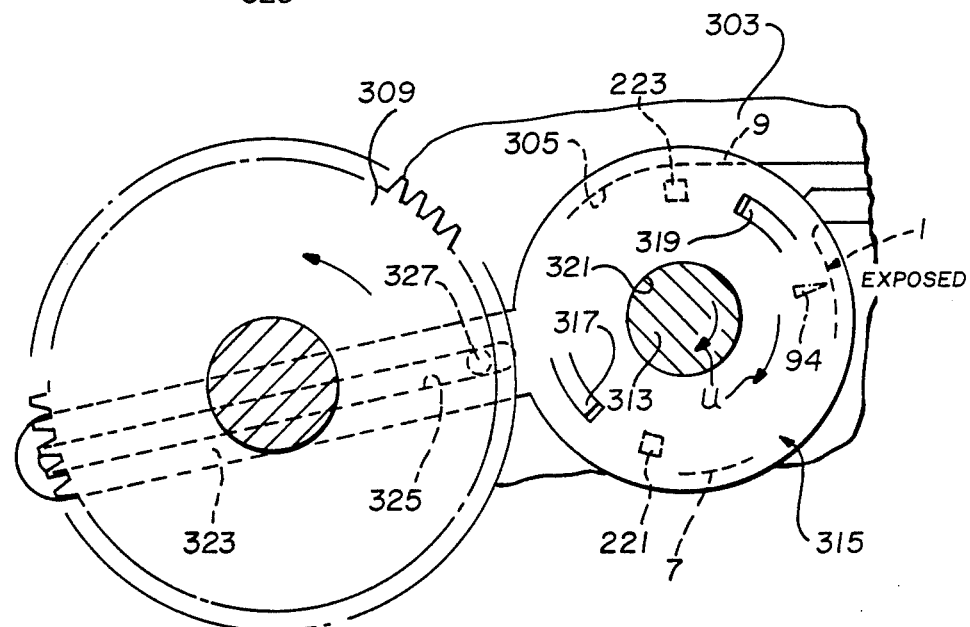
FIG. 18D is a schematic view continuing from FIG. 18C to show movement of the drive means when the status indicator is in its exposed position.

Continued operation of the film transport means to move successive unexposed frames of the filmstrip F into the exposure position and to move exposed frames onto the take-up drum rotates the core hub 313 in the unwinding direction U and oscillates the drive ring 315 in that direction and in the winding direction W, moving the respective spring fingers 317 and 319 away from and back towards the two fixtures 221 and 223 of the status indicator 77. The indicator 77 remains in its third (exposed) position. See FIG. 18D.

The invention has been described with reference to preferred and alternate embodiments. However, it will be appreciated that variations and modifications can be effected with the ordinary skill in the art without departing from the scope of the invention. For example, instead of rotating the status indicator 77 of the film cassette 1 from its normal first (unexposed) position to its third (exposed) position either when the filmstrip F is advanced from the cassette to move the first-available unexposed frame of the filmstrip to the exposure position or when the filmstrip is returned partially to the cassette to move the first-available unexposed frame to the exposure position, the indicator could be rotated from its first position to its third position responsive to various other known changes of state of the filmstrip relative to the cassette.

We claim:

1. A photographic camera to be used with a film cassette having a film-exposure status indicator movable from an unexposed position for providing a visible indication that a filmstrip within the cassette is unexposed, to a partly exposed position for providing a visible indication that the filmstrip is only partly exposed, and to an exposed position for providing a visible indication that exposure of the filmstrip is completed, wherein said camera includes film drive means for changing a state of the filmstrip relative to the cassette and is characterized in that:

indicator moving means is operatively coupled with said film drive means for moving the status indicator from the indicator's unexposed position to the indicator's exposed position, without stopping at the indicator's partly exposed position, substantially when the drive means changes the state of the filmstrip relative to the cassette.

2. A photographic camera as recited in claim 1, wherein said film drive means includes drive integral means for changing the state of the filmstrip relative to the cassette by advancing the filmstrip from the cassette to expose the filmstrip, and said indicator moving means includes moving integral means for moving the status indicator from the indicator's unexposed position immediately to the indicator's exposed position responsive to said drive integral means advancing the filmstrip from the cassette.

3. A photographic camera as recited in claim 2, wherein said drive integral means is connectable with a film spool within the cassette for rotating the film spool in a film unwinding direction to advance the filmstrip from the cassette, and said moving integral means is adapted to move the status indicator simultaneously in an opposite direction to move the status indicator from its unexposed position to its exposed position.

4. A photographic camera as recited in claim 1, wherein said film drive means includes drive integral means for changing the state of the filmstrip relative to the cassette by returning the filmstrip to the cassette to safeguard the filmstrip, and said indicator moving means includes moving integral means for moving the status indicator from the indicator's unexposed position immediately to the indicator's exposed position responsive to said drive integral means returning the filmstrip to the cassette.

5. A photographic camera as recited in claim 4, wherein said drive integral means is connectable with a film spool within the cassette for rotating the film spool in a film winding direction to return the filmstrip to the cassette, and said moving integral means is adapted to move the status indicator simultaneously in the same direction to move the status indicator from its unexposed position to its exposed position.

6. A photographic camera as recited in claim 1, wherein said indicator moving means includes an indicator drive element supported for movement first to engage the status indicator in the indicator's unexposed position and then to move the status indicator form the indicator's unexposed position to the indicator's exposed position, and said film drive means and said indicator drive element include respective cooperating means for moving the drive element to engage and move the status indicator immediately to the indicator's exposed position responsive to a change of state of the filmstrip relative to the cassette.

7. A photographic camera as recited in claim 6, wherein said respective cooperating means of said film drive means and said indicator drive element are adapted to move the drive element out of engagement with the status indicator substantially when the film drive means is operated with the status indicator in the indicator's exposure position.

8. A photographic camera as recited in claim 6, wherein said respective cooperating means of said film drive means and said indicator drive element are adapted to avoid moving the drive element substantially when the film drive means is operated with the drive element engaging the status indicator and with the status indicator in the indicator's exposure position.

* * * * *